(12) United States Patent
Arnou

(10) Patent No.: US 10,184,482 B2
(45) Date of Patent: Jan. 22, 2019

(54) CAPACITY CONTROL SYSTEM AND METHOD FOR MULTI-STAGE CENTRIFUGAL COMPRESSOR

(71) Applicant: JOHNSON CONTROLS TECHNOLOGY COMPANY, Plymouth, MI (US)

(72) Inventor: Damien Jean Daniel Arnou, La Séguinière (FR)

(73) Assignee: Johnson Controls Technology Company, Auburn Hills, MI (US)

( * ) Notice: Subject to any disclaimer, the term of this patent is extended or adjusted under 35 U.S.C. 154(b) by 158 days.

(21) Appl. No.: 15/202,093

(22) Filed: Jul. 5, 2016

(65) Prior Publication Data

US 2017/0009775 A1    Jan. 12, 2017

Related U.S. Application Data

(60) Provisional application No. 62/188,777, filed on Jul. 6, 2015.

(51) Int. Cl.
*F04D 27/02* (2006.01)
*F04D 17/12* (2006.01)
(Continued)

(52) U.S. Cl.
CPC ......... *F04D 27/0284* (2013.01); *F04D 17/12* (2013.01); *F04D 17/122* (2013.01);
(Continued)

(58) Field of Classification Search
CPC .. F04D 27/0284; F04D 17/12; F04D 27/0246; F25B 49/022; F25B 2600/0253; F25B 2700/1933
See application file for complete search history.

(56) References Cited

U.S. PATENT DOCUMENTS 4,608,833 A    9/1986  Kountz
7,845,179 B2 *  12/2010  Singh .................... F25B 49/005
                                                     62/129
(Continued)

FOREIGN PATENT DOCUMENTS

WO    2012177582    12/2012

OTHER PUBLICATIONS

International Search Report and Written Opinion for PCT Application No. PCT/US2016/040663 dated Sep. 29, 2016, 16 pages.

*Primary Examiner* — Larry Furdge
(74) *Attorney, Agent, or Firm* — Fletcher Yoder, P.C.

(57) ABSTRACT

A method for controlling multi-stage centrifugal compressors is provided. The method includes, for each stage of the compressor, defining a Mach ratio and impeller diameter, calculating a minimum required motor drive frequency to operate free from surge conditions for a current head factor and flow reduction device position, and adjusting the flow reduction device position while maintaining an actual motor drive frequency at a acceptable level to achieve a leaving chilled water temperature set point. The method also includes measuring a suction pressure and a discharge pressure and calculating a saturated suction temperature and a saturated discharge temperature for each stage of the compressor. The method further includes calculating an actual minimum motor drive frequency that is the greater of a first actual minimum motor drive frequency and a second actual minimum motor drive frequency associated with a first compressor stage and a second compressor stage of the compressor, respectively.

5 Claims, 5 Drawing Sheets

(51) Int. Cl.
*F25B 49/02* (2006.01)
*F25B 1/10* (2006.01)
*F25B 1/053* (2006.01)

(52) U.S. Cl.
CPC ..... *F04D 27/0246* (2013.01); *F04D 27/0261* (2013.01); *F25B 49/022* (2013.01); F05B 2210/14 (2013.01); F05B 2270/1081 (2013.01); F05B 2270/303 (2013.01); F05B 2270/3011 (2013.01); F05B 2270/3013 (2013.01); F05B 2270/327 (2013.01); F25B 1/053 (2013.01); F25B 1/10 (2013.01); F25B 2500/19 (2013.01); F25B 2600/0253 (2013.01); F25B 2700/1931 (2013.01); F25B 2700/1933 (2013.01); Y02B 30/741 (2013.01)

(56) References Cited

U.S. PATENT DOCUMENTS

| 2005/0223737 | A1 | 10/2005 | Conry |
| 2013/0189074 | A1* | 7/2013 | Chen ................ F04D 17/10 415/1 |
| 2014/0260388 | A1 | 9/2014 | Umeda et al. |

* cited by examiner

CAPACITY CONTROL SYSTEM AND METHOD FOR MULTI-STAGE CENTRIFUGAL COMPRESSOR

CROSS-REFERENCE TO RELATED APPLICATIONS

This application claims priority from and the benefit of U.S. Provisional Patent Application No. 62/188,777, entitled CAPACITY CONTROL SYSTEM AND METHOD FOR MULTI-CENTRIFUGAL COMPRESSOR, filed Jul. 6, 2015, which is hereby incorporated by reference.

BACKGROUND

The application generally relates to a capacity control system and method for a multi-stage centrifugal compressor. The application relates more specifically to systems and methods for managing the control of a variable geometry diffuser or pre-rotation vanes for each compressor in a multi-stage centrifugal compressor to optimize compressor operating efficiency while avoiding surge conditions in the compressor.

Design conditions for a centrifugal compressor may be defined by the gas flow, temperature and pressure conditions at suction and discharge. The compressor may operate continuously at conditions that are close to the design conditions, or the operating environment may deviate widely from design conditions during extended periods of time. Compressors used in HVAC systems may be subject to wide variations. The gas flow depends on the demand for cooling load, while the pressure conditions, especially the condensing pressure, depend on the ambient temperature conditions.

When operating conditions deviate from the design conditions a centrifugal compressor may encounter instabilities such as surge or stall during operation. Surge or surging is a transient phenomenon having oscillations in pressures and flow, and can result in complete flow reversal through the compressor. When surging, a compressor may be unable to deliver the desired flow at the desired pressure conditions. Furthermore, surging can cause excessive vibrations in both the rotating and stationary components of the compressor, and may result in compressor damage. Various devices and control parameters can be used to adjust the compressor operation to desired flow and pressure conditions while avoiding compressor surging. The simplest way to reduce the flow of a centrifugal compressor is to reduce its speed. Turbine drives, for example, may be operated at variable speed, or electric motors with electrical power supplied through a variable speed drive (VSD). When available, speed reduction can be used only to a limited extent to avoid surge. When speed reduction is not possible, another solution is to use a flow reduction device ("FRD"), such as pre-rotation vanes ("PRV") at compressor inlet, or a variable geometry diffuser ("VGD") to reduce the flow of the compressor. When the possibilities of reduced speed and of various FRD's have been exhausted, another technique to correct a surge condition involves the opening of a hot gas bypass valve to return some of the discharge gas of the compressor to the compressor inlet to increase the flow at the compressor inlet. Depending on their availability on the machine, the settings of aforementioned devices, namely the variable speed drive, pre-rotation vanes, variable geometry diffuser and hot gas by-pass are managed by a stability control algorithm intended to keep the machine in stable operation out of surge at the desired operating conditions, while optimizing its efficiency.

Active magnetic technology in the form of electromagnetic bearings is currently utilized in some turbomachinery drivelines, such as motors, compressors or turbines, to reduce friction while permitting free rotational movement by levitating rotors and shafts during operation. Electromagnetic bearings replace conventional technologies like rolling element bearings or fluid film bearings in the operation of such rotating apparatus, but require centering of the shaft within the electromagnetic bearings. When the compressor is operating normally, there is no mechanical contact between the rotating shaft and the stationary parts of the driveline. In the event of an unusual overload conditions such as surge in a turbo machine the load capacity of the bearings can be exceeded; the compressor shaft can no longer be supported by the electromagnetic bearings, resulting in a safety trip of the magnetic bearings.

In HVAC systems including a variable speed motor, the stability control algorithms are used in conjunction with the variable speed drive. Adaptive capacity control logic utilizing system operating parameters and compressor FRD position information can be used, e.g., to operate the compressor at a faster speed when a surge is detected while stability control algorithms are in a surge reacting state. Past performance parameters can be mapped and stored in memory to avoid future surge conditions by the adaptive capacity control logic. A description of an exemplary adaptive capacity control process is provided in U.S. Pat. No. 4,608,833 which patent is hereby incorporated by reference.

However, where magnetic bearings are utilized in the compressor, an adaptive control logic that relies on the compressor entering a surge condition is undesirable, to the extent that a surge condition poses an increased risk of a system shutdown that causes nuisance trips and may reduce the life time of the bearings.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to two stage centrifugal compressor with VSD drive each compressor stage mounted on a single shaft and then operating at the same speed.

Another embodiment relates to multi-stage compressor mounted on a single shaft.

Another embodiment relates to the control of several compressor arranged in series or in parallel with each compressor having an independent speed.

The advantages of the embodiments described herein are the optimization of compressor performance with increased benefits at reduced compressor flow.

Alternative exemplary embodiments relate to other features and combinations of features as may be generally recited in the claims.

DETAILED DESCRIPTION OF THE EXEMPLARY EMBODIMENTS

Figure 1:
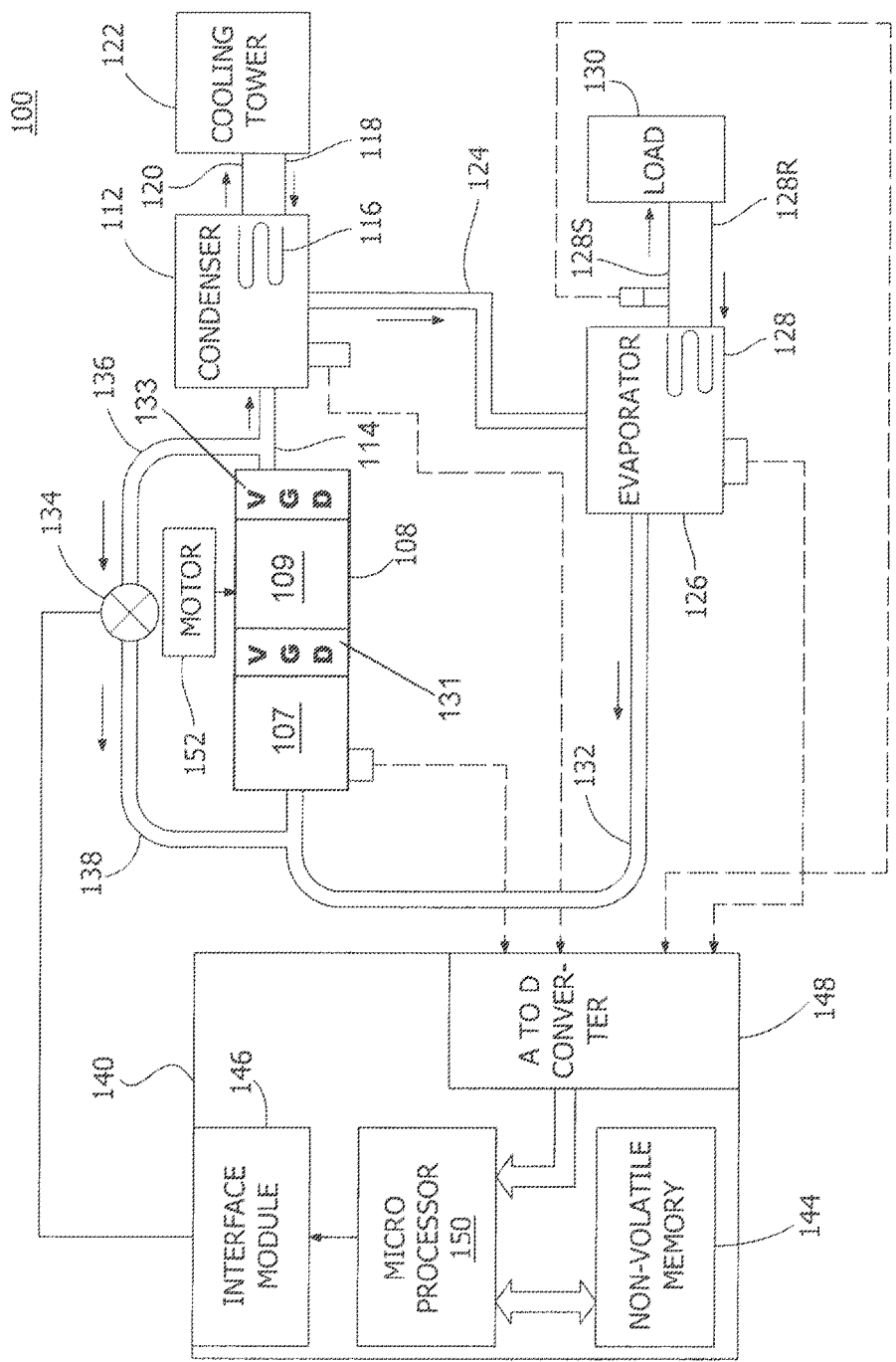
FIG. 1 is an exemplary vapor compression system for heating, ventilation and air conditioning (HVAC), refrigeration or liquid chiller systems.

FIG. 1 schematically shows an exemplary vapor compression system 100 that may be used in heating, ventilation and air conditioning (HVAC), refrigeration or liquid chiller systems. Vapor compression system 100 includes a centrifugal compressor 108 that compresses the refrigerant vapor and delivers it to a condenser 112 via line 114 Compressor 108 includes two stages, 107, 109. The condenser 112 includes a heat-exchanger coil 116 having an inlet 118 and an outlet 120 connected to a cooling tower 122. The condensed liquid refrigerant from condenser 112 flows via line 124 to an evaporator 126. The evaporator 126 includes a heat-exchanger coil 128 having a supply line 128S and a return line 128R connected to a cooling load 130. The vapor refrigerant in the evaporator 126 returns to compressor 108 via a suction line 132. First compressor stage 107 receives vapor refrigerant from suction line 132 and delivers compressed vapor refrigerant via a line containing the first compressor stage VGD 131 to an inlet of second compressor stage 109. Second compressor stage 109 further compresses the vapor refrigerant and delivers it via a line containing the second compressor stage VGD 133 to the discharge line 114. A hot gas bypass (HGBP) valve 134 may be interconnected between lines 136 and 138 which are extended from the outlet of the compressor 108 to the inlet of VGD 133.

Vapor compression system 100 can circulate a fluid, e.g., a refrigerant, through a compressor 108 driven by a motor 152, a condenser 112, an expansion device (not shown), and an evaporator 126. System 100 can also include a control panel 140 that can have an analog to digital (A/D) converter 148, a microprocessor 150, a non-volatile memory 144, and an interface board 146. Some examples of fluids that may be used as refrigerants in vapor compression system 100 are hydrofluorocarbon (HFC) based refrigerants (e.g., R-410A), carbon dioxide ($CO_2$; R-744), and any other suitable type of refrigerant.

A control panel 140 includes an interface module 146 for opening and closing the HGBP valve 134. Control panel 140 includes an analog to digital (A/D) converter 148, a microprocessor 150, a non-volatile memory 144, and an interface module 146.

Driver 152 used with compressor 108 is capable of variable speed. Driver 152 may be a variable speed engine or turbine, or an electric motor powered by a variable speed drive (VSD) or can be powered directly from an alternating current (AC) or direct current (DC) power source. A VSD, if used, receives AC power having a fixed line frequency and fixed line voltage (within a tolerance range) from the AC power source and provides power having a variable voltage and frequency to the motor. Motor 152 can be any type of electric motor that can be powered by a VSD or directly from an AC or DC power source. Compressor 108 compresses a refrigerant vapor and delivers the compressed vapor to condenser 112 through a discharge line. In an exemplary embodiment, compressor 108 can be a centrifugal compressor. The refrigerant vapor delivered by compressor 108 to condenser 112 transfers heat to a suitable fluid that can be, e.g., water or air. The refrigerant vapor condenses to a refrigerant liquid in condenser 112 as a result of the heat transfer with the fluid. The liquid refrigerant from condenser 112 flows through an expansion device (not shown) to an evaporator 126. The liquid refrigerant delivered to evaporator 126 absorbs heat from a suitable fluid that can be air or water and undergoes a phase change to a refrigerant vapor. The vapor refrigerant exits evaporator 126 and returns to compressor 108 by a suction line to complete the cycle.

In an exemplary embodiment shown in FIG. 1, the refrigerant vapor in condenser 112 enters into the heat exchange relationship with water, flowing through a heat-exchanger 116 connected to a cooling tower 122. The refrigerant vapor in condenser 112 undergoes a phase change to a refrigerant liquid as a result of the heat exchange relationship with the water in heat-exchanger coil. Evaporator 126 can include a heat-exchanger 128 having a supply line 128S and a return line 128R connected to a cooling load 130. Heat-exchanger 128 can include a plurality of tube bundles within evaporator 126. A secondary liquid, e.g., water, ethylene, calcium chloride brine, sodium chloride brine or any other suitable secondary liquid, travels into evaporator 126 via return line 128R and exits evaporator 126 via supply line 128S. The liquid refrigerant in evaporator 126 enters into a heat exchange relationship with the secondary liquid in heat-exchanger 128 to chill the temperature of the secondary liquid in heat-exchanger coil 128. The refrigerant liquid in evaporator 126 undergoes a phase change to a refrigerant vapor as a result of the heat exchange relationship with the secondary liquid in heat-exchanger coil 128.

At the discharge of first compressor stage 107, there is a VGD 131 used to control the flow of refrigerant of compressor stage 107. At the discharge of second compressor stage 109, there is a VGD 133 used to control the flow of refrigerant of compressor stage 109. Flow of compressor 108 is the resultant of the flow through both compressor stages 107 and 109. Actuators are used to control VGD 131 and 133.

When an operating point of a compressor, defined by a head factor ($\Omega$) and a flow factor ($\Theta$), is within the operation limits of a compressor, it is generally possible to obtain this operating point at various combinations of speed and VGD 131, 133 position. The optimal operational efficiency is achieved by operating the compressor at the lowest speed that is possible without surging. Control panel 140 is programmed to determine a lowest speed possible and adjust the VGD 131, 133 to the required capacity. Further, for any compressor speed, the compressor cannot exceed a maximum head factor $\Omega_{surge}$ without going into surge. Once the compressor geometry, and the compressed gas and operating conditions are defined, compressor speed can be converted into a Mach number. The Mach number is a parameter that can be defined as the tip speed of the impeller divided by the speed of sound at a specific point in the system. The specific point may be located at the impeller inlet, although other points in the system may also be used.

In another embodiment, if a FRD is used, a multiplier of speed increase on a percentage opening of the FRD utilizing a FRD actuator feed-back signal can be used as discussed below.

In another embodiment, the actual compressor head can be the actual isentropic head.

Compressor head can be estimated from refrigerant properties measured upstream and downstream the compressor as discussed in greater detail below.

A typical set of curves gives the head factor ($\Omega$) versus flow factor ($\Theta$) of a single stage compressor for various rotation speeds (or Mach numbers). Each of these curves is called the "speed line" of the compressor at the given Mach number. At a given speed or Mach number and with fully open FRD, starting from a point A at the right of the curve high flow and low head, when the head is increased, the flow reduces until the surge point B is reached. The maximum head factor $\Omega_{surge}$ at a given Mach number is achieved with fully open VGD (or other FRD), at the operating point where the speed line intersects the "surge line" C. This set of curves can illustrate performances of any single stage centrifugal compressor. It can be applied to compressors 107 or 109. Compressor 109 is taken as reference of illustration of items described in paragraphs [0029] to [0034] below.

Figure 3:
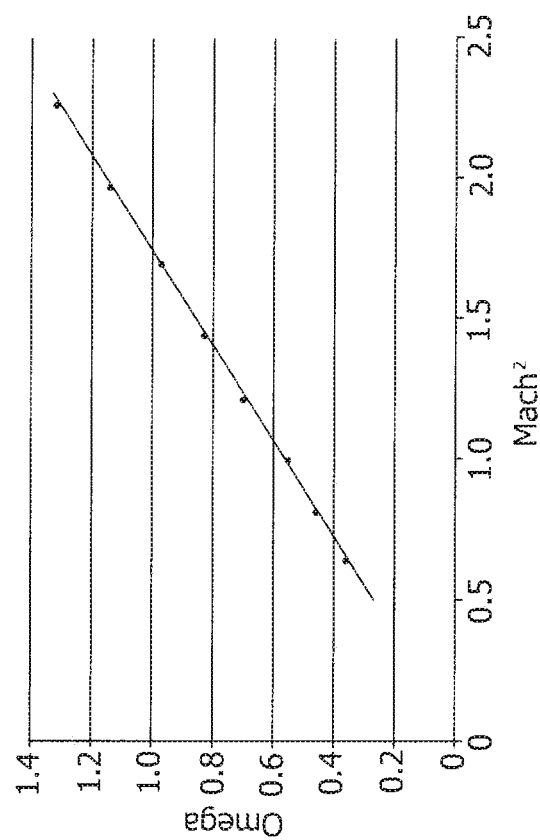
FIG. 3 is an exemplary proportionality plot of $\Omega_{surge}$ versus Mach$^2$ for an exemplary compressor.

For a given compressor, $\Omega_{surge}$ can be plotted versus Mach$^2$. In theory, both are proportional. This theory is usually very well validated in practice, as seen on FIG. 3, representing an exemplary plot for a real industrial compressor.

The proportionality coefficient is defined as MachRatio$^2$=Mach$^2$/$\Omega$. For a series of compressors extrapolated from the same design by applying a scale factor, the MachRatio is nearly the same irrespective of the compressor size. Therefore, for a given head factor $\Omega$, a corresponding minimum mach number may be calculated, to avoid a surge condition in compressor 109 when compressor is operating with VGD 133 fully open. In another embodiment, for a given head factor $\Omega$, a corresponding minimum RPM or minimum motor rotation frequency may be used instead of the Mach number.

Based on the proportionality coefficient defined above, Mach$_{surge}$=MachRatio*$\Omega^{0.5}$ Note that Mach number is defined as the ratio of the impeller tip speed divided by speed of sound calculated at compressor suction. It is proportional to RPM, and to the impeller outside diameter. Also, MachRatio is the minimum Mach number that the compressor can operate while stable—i.e., without entering a surge condition—with VGD 133 open at $\Omega$=1.

The value of the variable MachRatio may be adjusted to include a margin with respect to surge. Selecting a higher MachRatio value will increase the safety margin with respect to surge. But a higher MachRatio value will also result in lower compressor efficiency at part load, i.e., a higher motor speed with VGD 133 closed.

When operating compressor 109 with VGD 133 partially closed and operating at constant compressor speed, the head pressure that compressor 109 can deliver is reduced the more VGD 133 is closed. E.g., in one exemplary embodiment, wherein M=1.25, the head reduction versus VGD opening is represented in the following table:

| % VGD | $\Omega_{surge}$(% VGD) | HeadReduction (% VGD) | Speed Increase (% VGD) |
|---|---|---|---|
| 100 | 0.92 | 1.000 | 1.000 |
| 80 | 0.90 | 0.978 | 1.011 |
| 60 | 0.89 | 0.967 | 1.017 |
| 40 | 0.86 | 0.935 | 1.034 |
| 20 | 0.82 | 0.891 | 1.059 |
| 10 | 0.77 | 0.837 | 1.093 |
| 3 | 0.65 | 0.707 | 1.190 |
| 0 | 0.55 | 0.598 | 1.293 |

$\Omega_{surge}$(% VGD) indicates the maximum head factor before surge for the associated % VGD; and
HeadReduction(% VGD) is defined as a ratio of: $\Omega_{surge}$(% VGD)/$\Omega_{surge}$(100% VGD).
SpeedInrease(% VGD) defines the ratio of speed increase required to keep the compressor out of surge The coefficient of HeadReduction (% VGD) can be considered as independent of compressor speed for easiest implementation. In order to avoid compressor surge at constant head pressure, compressor speed needs to increase as VGD 133 closes.

Figure 2:
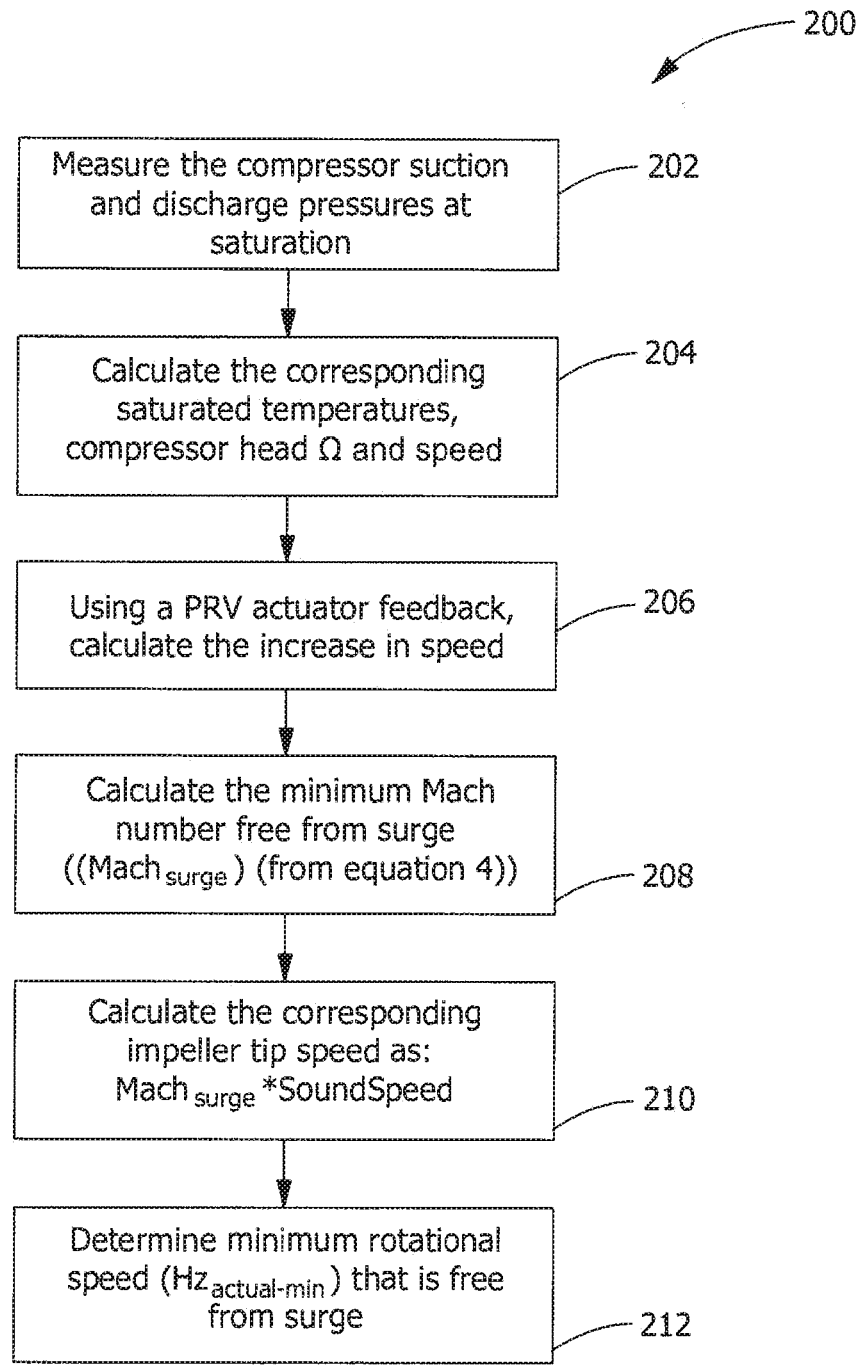
FIG. 2 shows an exemplary method of computing and controlling the rotational speed of a compressor equipped with a PRV.

Referring next to FIG. 2, a novel method of computing and controlling the compressor rotational speed is shown. Additional details of the method are disclosed in commonly owned patent application PCT/US2012/043047, which is hereby incorporated by reference. The method 200 begins at step 202, by measuring the suction and discharge pressures of the compressor at saturation. Next, the method proceeds to step 204, and calculates the saturated temperatures corresponding with the suction and discharge pressures of the compressor at saturation. From the saturated temperatures the compressor head $\Omega$ and speed of sound are also calculated using adequate correlations. Next, the method proceeds to step 206, in which the multiplier of speed increase is calculated based on the percentage of the PRV, utilizing the PRV actuator feed-back. Note that the method is identical in case of use of VGD or any FRD instead of PRV. The method then proceeds to step 208, to calculate the minimum Mach number at which the compressor may operate while stable and out of surge from equation (4) as follows:

MachSurge=MachRatio*SpeedIncrease(% VGD)
*$\Omega$0.5   EQ. 5

Next, at step 210, the method calculates an impeller tip speed corresponding to the variable MachSurge:

Tip Speed=MachSurge*Sound Speed   EQ. 6

The method proceeds to step 212, and calculates minimum rotational speed (Hz$_{actual-min}$) at which the compressor may operate while stable and out of surge as:

Hz$_{actual\_min}$=Tip Speed/(ImpellerOD*$\pi$)   EQ. 7

Control of Two-Stage Compressor with Same VGD Position at Each Stage

Figure 4:
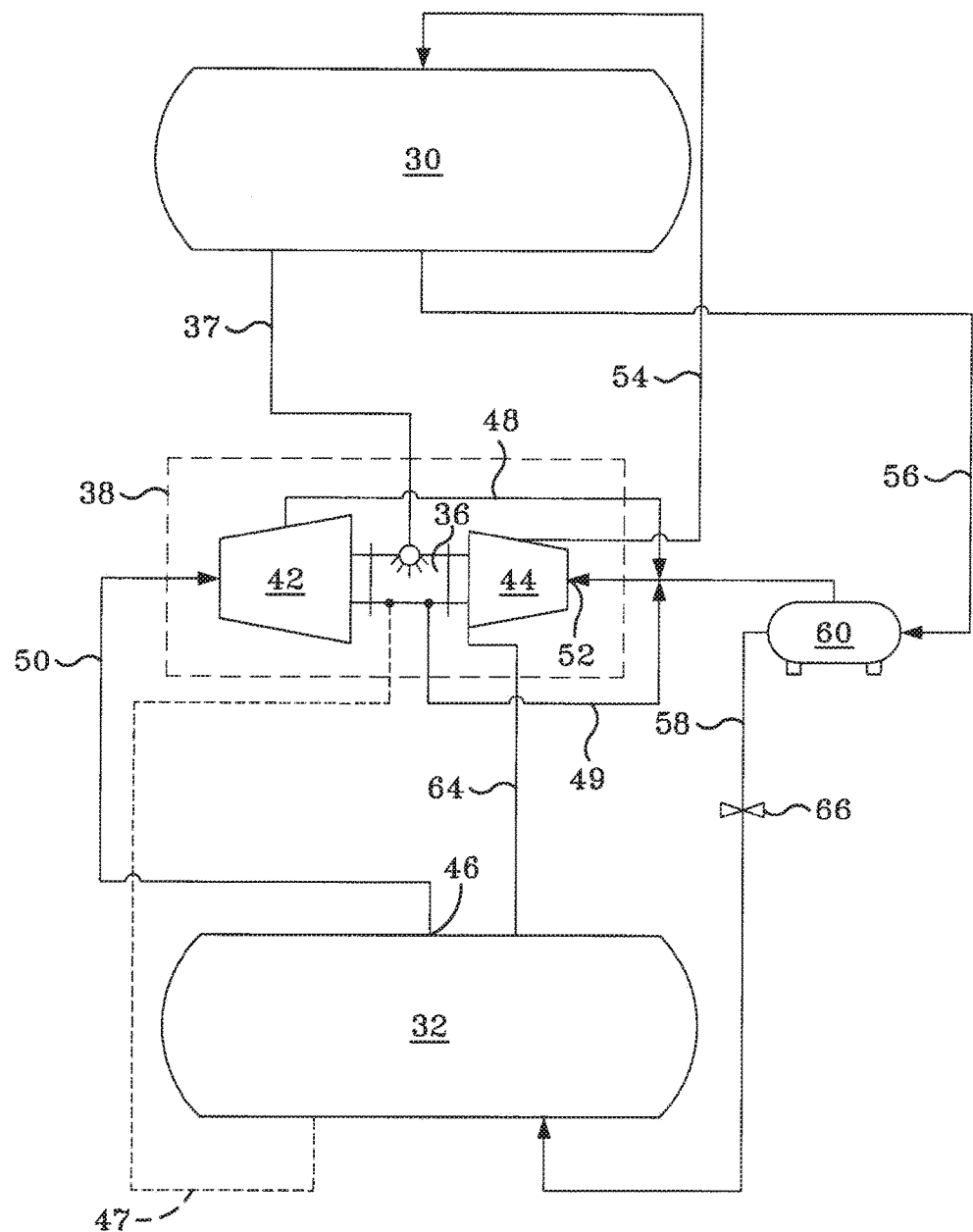
FIG. 4 is an exemplary multi-stage compressor system with one compressor stage at each end of a common motor shaft.

In FIG. 4, an exemplary multi-stage compressor system is shown. The multi-stage compressor 38 includes a first compressor stage 42 and a second compressor stage 44. First compressor stage 42 and second compressor stage 44 are disposed on opposite ends of motor 36, which drives each of compressor stages 42, 44 at the same speed. Vapor refrigerant is drawn into first compressor stage 42 through refrigerant line 50. Refrigerant line 50 is supplied by a discharge line 46 of evaporator 32. The vapor refrigerant is compressed by first compressor stage 42, and discharged into an interstage crossover line 48. Interstage crossover line 48 is connected at an opposite end to a suction input 52 of a second compressor stage 44. The refrigerant is further compressed in second compressor stage 44 for output to compressor discharge line 54, and supplied to condenser 30, where the pressurized vapor refrigerant is condensed into a liquid. In the exemplary embodiment shown in FIG. 4, an optional economizer circuit 60 is inserted into a liquid refrigerant return path 56, 58, and a vapor flow line 62 is connected to suction inlet 52, for providing intermediate pressure refrigerant to second compressor stage 44, to increase the efficiency of the refrigeration cycle.

Figure 5:
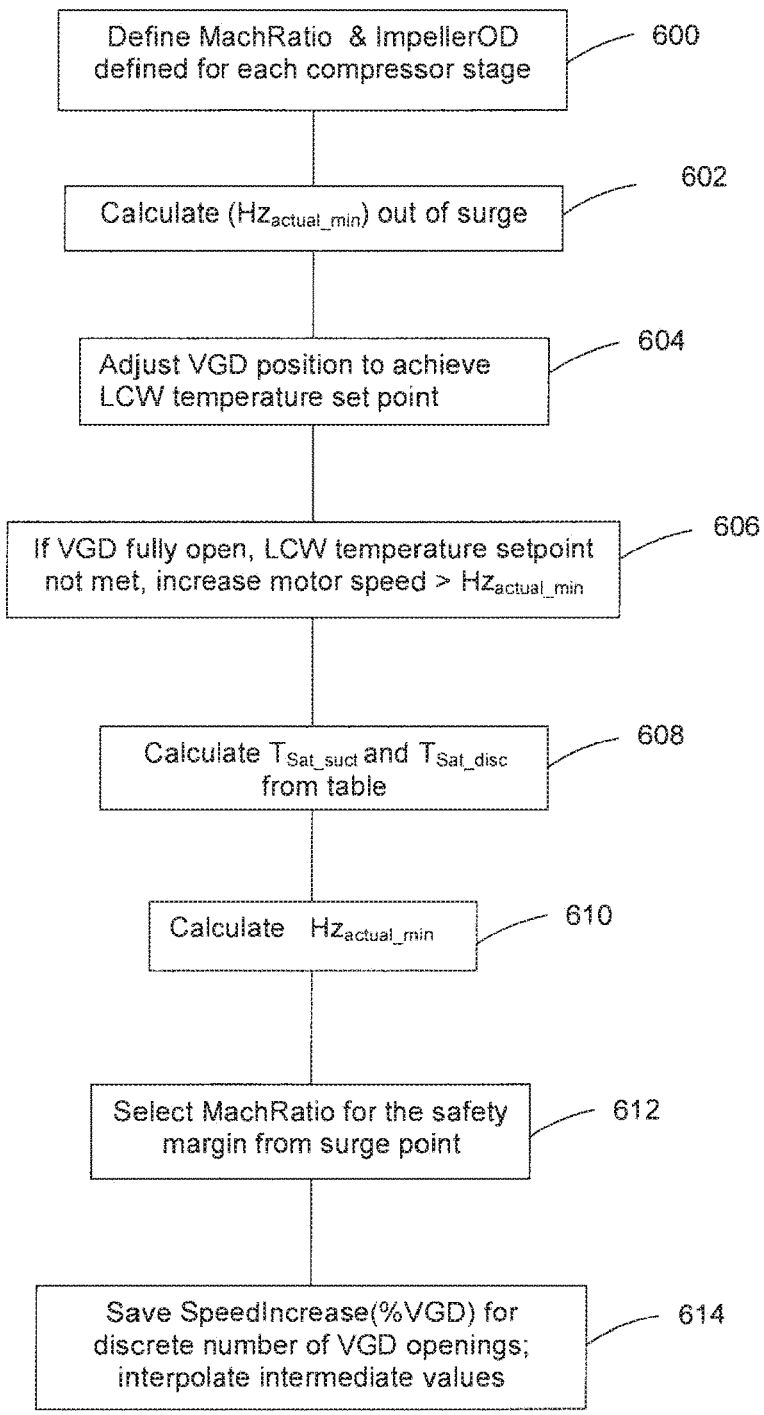
FIG. 5 is a flow chart for programming a controller for a two-stage centrifugal compressor equipped with VGD.

Referring next to FIG. 5, a method is disclosed for programming a controller for a two-stage centrifugal compressor 108. The two-stage centrifugal compressor 108 may include magnetic bearings and high speed motor with VSD for speed control.

At step 600, a Mach Ratio (MachRatio) and impeller diameter (ImpellerOD) are defined for each compressor stage. At step 602 the system control calculates the minimum required motor frequency (Hzactual_min) for each stage of the compressor to operate out of surge, for the actual head at each stage and VGD position. VGD position is the same for the 2 compressor stages. At step 604 the leaving chilled water (LCW) temperature set point is controlled by the controller 150, first by adjusting the position of the VGD, while maintaining the motor frequency at its lowest acceptable value (Hzactual_min). At step 606, once the VGD is fully open, if the leaving water temperature set point is not achieved, the motor speed is increased above Hzactual_min within the limits of the maximum frequency for the driveline components.

At step 608, the system calculates saturated suction and discharge temperatures TSat_suct and TSat_disc from measured pressure using a controller saturation table. Next, at step 610, calculate the actual minimum motor frequency Hzactual_min using EQ. 5, 6, 7 described above.

At step 612, the mach ratio may be selected to permit for the desired safety margin from a surge point. A higher value for mach ratio will provide a greater safety margin with respect to the surge point, but will result in lower efficiency at part load—i.e., a higher motor speed with a closed VGD. At step 614, the speed increase value (SpeedIncrease (% VGD)) may be saved in the controller under a table of values for a discrete number of VGD openings. Intermediate values may then be calculated by linear interpolation by the controller.

For two stage compressors the mach ratio and the impeller outside diameter (ImpellerOD) are defined for each compressor stage. The head factor $\Omega$ and the speed of sound (SoundSpeed) must be calculated for each stage. The actual minimum speed for the compressor is defined as the greater of the actual minimum speeds of the two compressor stages, i.e., Hzactual_min=max (Hzactual_min_1st; Hzactual_min_2nd), with: Hzactual_min_1st and Hzactual_min_2nd the minimum speed for 1st and 2nd stage. The speed increase (SpeedIncrease (% VGD)) table is applied to both stages.

Control of Two-Stage Compressor with Different VGD Position at Each Stage

The concept of the invention is described here for a two stage centrifugal in the arrangement of FIG. 4 for a chiller application. During normal operation the positions for the first stage VGD and the second stage VGD are controlled separately. The capacity need required by the chiller is determined by the difference between leaving water temperature and the corresponding set point. This need is satisfied with variation of compressor speed, between maximum allowed compressor speed and Hzactual_min_1st defined above, and with variation of the 1st stage VGD position, between its maximum and minimum allowed position. The compressor speed is always kept to the minimum acceptable value before surge in order to have the optimum efficiency.

At part load operation, with 1st stage VGD partly closed, the optimum efficiency of a centrifugal compressor is obtained close to the surge point, with a sufficient margin for safe operation. The objective of the MachRatio for a given compressor is to satisfy these both conditions. Operating the first compressor stage at Hzactual_min_1st with 1st stage VGD partly closed then ensures to get the optimum efficiency from the 1st stage compressor. This compressor control and its benefits are more precisely described in patent A2925619 for a single stage compressor and is here applied identically for the 1st compressor stage.

During compressor operation, 2nd stage head coefficient $\Omega$2nd stage is calculated. This value and SpeedIncrease (% VGD2nd stage) allow to calculate Hzactual_min_2nd. Practically, considering a constant compressor speed and a given volume flow at 2nd stage compressor suction, Hzactual_min_2nd increases when the 2nd stage VGD is opened. Inversely, keeping the same speed and flow, Hzactual_min_2nd decreases when the 2nd stage VGD is closed. The 2nd stage VGD can then be used to modify Hzactual_min_2nd when needed.

The principle of the invention, is to control the second stage VGD position in order to obtain Hzactual_min_2nd equal, or close, to Hzactual_min_1st. When this condition is reached, each compressor stage operates close to its surge line at its optimum efficiency with enough safety margin to surge due to the use of an adequate MachRatio. As both compressor stages are close to the surge, the head of each stage is maximized and the speed is minimized which are the conditions for optimum efficiency.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the two-stage compressor control system, as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A method of controlling a multiple stage compressor while maintaining compressor stability, comprising:
   providing a compressor having a first compressor stage and a second compressor stage disposed on opposite ends of a motor shaft, each of the first and second compressor stages having a respective flow reduction device for controlling flow of refrigerant through the respective compressor stage, and a control system;
   defining a Mach ratio and impeller outside diameter for each compressor stage;
   calculating, for each stage of the compressor, a minimum required motor drive frequency to operate free from surge conditions for a current head factor and flow reduction device position;
   adjusting, for each stage of the compressor, the flow reduction device position while maintaining an actual motor drive frequency at a lowest acceptable level to achieve a leaving chilled water temperature set point;
   if the flow reduction device position for each stage of the compressor reaches a fully open position and the leaving chilled water temperature set point is not met, and a maximum motor drive frequency has not been exceeded, increasing the actual motor drive frequency to increase motor speed;
   measuring a suction pressure and a discharge pressure for each stage of the compressor;
   calculating, for each stage of the compressor, a saturated suction temperature and a saturated discharge temperature;
   calculating an actual minimum motor drive frequency, wherein the actual minimum motor drive frequency is the greater of a first actual minimum motor drive frequency associated with the first compressor stage and a second actual minimum motor drive frequency associated with the second compressor stage; and
   selecting the Mach ratio which provides a desired margin free from surge conditions.

2. The method of controlling the multiple stage compressor as recited in claim 1, wherein adjusting the flow reduction device position for each stage of the compressor comprises controlling each flow reduction device by an identical signal.

3. The method of controlling the multiple stage compressor as recited in claim 1, wherein calculating the saturated suction temperature and the saturated discharge temperature comprises extracting the saturated suction temperature and the saturated discharge temperature from a controller saturation table.

4. The method of controlling the multiple stage compressor as recited in claim 1, wherein a speed increase value may be saved in a controller under a table of values for a discrete number of flow reduction device positions.

5. A system for controlling a multiple stage compressor, comprising:
   a compressor having a first compressor stage and a second compressor stage, a condenser and an evaporator connected in a closed refrigerant loop, each compressor stage having a flow reduction device;
   a control system configured to control a capacity of each stage of the compressor, the control system configured to:
   calculate a minimum required motor drive frequency;
   adjust a flow reduction device positon;
   if the flow reduction device position reaches a fully open position and a leaving chilled water set point is not met, increase an actual motor drive frequency;
   measure a suction pressure and a discharge pressure;
   calculate a saturated suction temperature and a saturated discharge temperature;
   calculate an actual minimum motor drive frequency, wherein the actual minimum motor drive frequency is the greater of a first actual minimum motor drive frequency associated with the first compressor stage and a second actual minimum motor drive frequency associated with the second compressor stage;
   select a Mach ratio providing a margin free from surge conditions; and
   controlling the compressor to operate free from a surge condition.

* * * * *